(12) United States Patent
Ganz et al.

(10) Patent No.: US 7,681,416 B2
(45) Date of Patent: Mar. 23, 2010

(54) METHOD FOR PRODUCTION OF AN OPTICAL COMPONENT MADE FROM QUARTZ GLASS

(75) Inventors: Oliver Ganz, Bruchköbel (DE); Rene Sowa, Pouch (DE); Peter Bauer, Mainhausen (DE); Norbert Cibis, Kahl am Main (DE); Ralph Sattmann, Aschaffenburg (DE); Jan Vydra, Hanau (DE); Clemens Schmitt, Blankenbach (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 1063 days.

(21) Appl. No.: 10/565,134

(22) PCT Filed: Jul. 18, 2004

(86) PCT No.: PCT/EP2004/008032

§ 371 (c)(1),
(2), (4) Date: Jan. 18, 2006

(87) PCT Pub. No.: WO2005/099912

PCT Pub. Date: Feb. 3, 2005

(65) Prior Publication Data

US 2006/0174659 A1    Aug. 10, 2006

(30) Foreign Application Priority Data

Jul. 18, 2003   (DE) ................................ 103 33 059

(51) Int. Cl.
*C03B 37/012* (2006.01)
*C03B 37/02* (2006.01)

(52) U.S. Cl. ........................................ 65/435; 65/439

(58) Field of Classification Search .................. 65/407, 65/112, DIG. 9, 433, 439
See application file for complete search history.

(56) References Cited

U.S. PATENT DOCUMENTS

| 4,812,154 | A | 3/1989 | Yoshida |
| 4,842,635 | A * | 6/1989 | Spaapen et al. ............... 65/108 |
| 6,460,378 | B1 | 10/2002 | Dong |
| 6,484,540 | B1 * | 11/2002 | Shimada et al. ............... 65/407 |
| 6,584,808 | B1 | 7/2003 | Roba |
| 2001/0007197 | A1 * | 7/2001 | Oga et al. ....................... 65/109 |
| 2002/0148257 | A1 * | 10/2002 | Shimizu et al. ............... 65/377 |
| 2004/0144133 | A1 * | 7/2004 | Fletcher et al. ............... 65/391 |

FOREIGN PATENT DOCUMENTS

EP    1 129 999 A2    9/2001

* cited by examiner

*Primary Examiner*—Steven P Griffin
*Assistant Examiner*—Erin Snelting
(74) *Attorney, Agent, or Firm*—Tiajoloff and Kelly LLP

(57) ABSTRACT

The production of an optical component from quartz glass, by elongation of a coaxial arrangement of a core rod and a hollow cylinder of a given length, is known. The arrangement is thus introduced into a heating zone with a vertical orientation, such that the lower end begins to partly soften and the component is drawn downwards from the softened part. The hollow cylinder has an inner passage, provided with a restriction in the region of the lower end thereof, on which the core rod is supported. Several methods are disclosed for formation of the restriction in which the inner passage (55) is mechanically machined to a final dimension and, in one version of the method, the restriction in the inner passage (55) is generated by means of softening the lower end face of the hollow cylinder, swaged against a tool and thus folded inwards with formation of a peripheral bead ring.

15 Claims, 3 Drawing Sheets

METHOD FOR PRODUCTION OF AN OPTICAL COMPONENT MADE FROM QUARTZ GLASS

Figure 1:
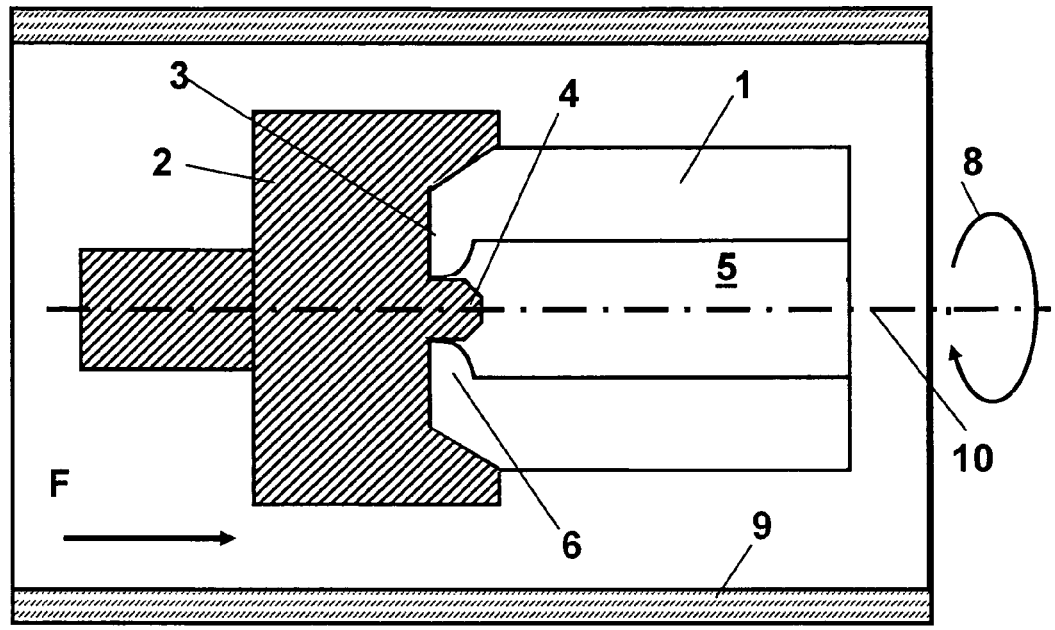

The present invention relates to a method for producing an optical component of quartz glass by elongating a coaxial arrangement of a core rod and a hollow cylinder of a predetermined length in that the arrangement is supplied in vertical orientation to a heating zone and is softened therein zonewise, starting with its lower end, and the component is drawn off downwards from the softened region, the hollow cylinder having an inner bore which in the region of its lower end is provided with a constriction on which the core rod is supported.

Furthermore, the present invention relates to a hollow cylinder of quartz glass for performing the method, the hollow cylinder comprising an inner bore which in the region of one of its ends is provided with a constriction.

Simple solid cylinders or intermediate products (preforms) for optical fibers are produced by collapsing and elongating a coaxial arrangement consisting of core rod and of at least one hollow cylinder overcladding the core rod. It is also known that a hollow cylinder is collapsed onto a core rod during fiber drawing, the last-mentioned method being called "ODD (overclad-during-drawing) method". All of the method variants require an exact coaxial guidance or fixation of the core rod in the hollow cylinder.

To ensure this and to guarantee, in addition, a damage-free introduction of the core rod into a jacket tube, U.S. Pat. No. 4,812,154 A1 suggests a method for producing a preform in which in the lower region of the jacket tube a restriction is produced with an inner diameter smaller than the outer diameter of the core rod. The jacket tube is vertically oriented and a nitrogen stream is passed from the lower side through the jacket tube. At the same time, starting with its lower end, the core rod is introduced into the jacket tube against the gas stream, whereby a centering of the core rod in the jacket tube, which prevents contact with the inner wall, is achieved by means of the gas stream. As soon as the lower and conically outwardly tapering end of the core rod comes to rest on the restriction of the jacket tube, core rod and jacket tube are fused with each other with formation of a preform.

It is suggested in another method according to EP 1 129 999 A2 that a core rod should be overclad with an inner cladding glass tube and an outer cladding glass tube at the same time. For fixing the core rod coaxially inside the inner and outer cladding glass tube, the outer cladding glass tube is provided in the region of the lower end with a restriction by way of heating. With a vertically oriented outer jacket tube a holding ring is introduced from above into the inner bore of the jacket tube, the ring having an outer diameter slightly larger than the diameter of the restriction, so that the holding ring comes to rest from above on the region of the restriction. With an exactly horizontal orientation, the middle bore of the holding ring yields a stop for the core rod provided with a conical lower end, whereas the first inner jacket tube is supported on the holding ring. Subsequently, the jacket tubes and the core rod are fused with each other, with a vacuum being produced and maintained in the inner bore of the outer jacket tube.

It is the object of the present invention to provide a further method for producing optical components of high quality by elongating a coaxial arrangement consisting of core rod and hollow cylinder, wherein for the purpose of fixing the core rod the hollow cylinder is provided with a constriction which can be produced at low costs and which permits a reproducible fixation of the core rod in the hollow cylinder with as little efforts as possible.

Furthermore, it is the object of the present invention to provide a hollow cylinder which comprises a defined constriction of the inner bore which can be produced with little efforts.

As for the method, this object, starting from the above-mentioned method, is achieved according to the invention on the one hand in that the inner bore is mechanically machined to a final dimension, and that the constriction of the inner bore is produced in that the lower front end of the hollow cylinder is softened, upset against a tool and thus folded inwards with formation of a peripheral bead ring.

A hollow cylinder which has been mechanically machined to a final dimension in the sense of this invention is also a cylinder whose inner surface has been mechanically machined to a final dimension and which is subsequently purified by etching. Uniform etching processes do not effect a significant change in the geometrical end shape of the hollow cylinder (such as a bend or ovality in the cross section).

According to the invention the constriction of the inner bore is produced by plastic deformation of the lower end of the hollow cylinder. To this end the lower front end of the hollow cylinder is softened and upset by means of a tool with formation of a peripheral bead ring and is folded inwards in this process. The constriction depends on the respective viscosity of the quartz glass, the shape of the tool and the contact pressure. The constriction of the inner bore can be produced in a reproducible manner without great efforts by observing these parameters.

With respect to a reproducible adjustment of the shape and size of the constriction, it has turned out to be particularly useful when the tool has a shaped part projecting into the inner bore, the inwardly folded quartz glass coming to rest on the shaped part with formation of the peripheral bead ring.

The inwardly folded softened quartz glass comes to rest on the shaped part, so that the outer contour of the shaped part projecting into the inner bore defines the inner contour of the resulting constriction.

In the simplest case a tool is used in which the shaped part has a conical surface projecting into the inner bore of the hollow cylinder. The inner diameter of the constriction is defined by the geometry of the conical surface, the penetration depth thereof into the inner bore and the contact of the softened quartz glass with the conical surface. The conical surface is e.g. formed as a tip or as a truncated cone.

As an alternative, it has turned out to be useful to employ a tool in which the shaped part is formed as a peg projecting into the inner bore of the hollow cylinder, which comprises an outer diameter corresponding to the inner diameter of the developing bead ring.

In this case the inner diameter of the constriction is obtained through the outer diameter of a cylindrical peg, namely independently of the penetration depth thereof, so that in comparison with the previously explained variant of the method less efforts are needed for achieving a high reproducibility.

A further improvement with respect to reproducibility is achieved when the tool has an annular groove whose outer diameter corresponds to the outer diameter of the hollow cylinder and whose inner diameter corresponds to the inner diameter of the bead ring.

The width of the annular groove of the tool is greater than the wall thickness of the hollow cylinder to be folded inwards at the end side. The outer boundary of the annular groove corresponds approximately to the outer diameter of the hollow cylinder. Its inner boundary is given by the outer circumference of the peg projecting into the inner bore. The annular groove forms a shape which is open at one side for the quartz glass which is plastically deformed in the deformation process for producing the constriction. Hence, a defined result of this deformation process is thereby ensured.

Hollow cylinder and tool can be heated by means of a propane, oxyhydrogen-gas or plasma burner to a temperature at which the quartz glass is softened. The heating of the said quartz glass parts by means of a burner has the advantage that the energy input can be changed in a rapid and flexible manner and limited to a narrow range.

Advantageously, the hollow cylinder and the tool are however heated in a furnace to a temperature at which quartz glass softens.

A defined temperature and a homogeneous temperature distribution can be set relatively easily in a furnace. Therefore, heating the hollow cylinder and the tool in a furnace will improve the reproducibility of the method for producing the constriction.

The use of a tool consisting of graphite or of carbon fiber-reinforced carbon has turned out to be appropriate. Said materials are distinguished by a high temperature resistance and by minor wetting in contact with quartz glass, so that the tools consisting thereof can be separated easily from the hollow cylinder of quartz glass after the deformation process. A further improvement is achieved in that the tool and the softened front end of the hollow cylinder are rotated opposite to each other about the longitudinal axis of the hollow cylinder.

This achieves a radial homogeneous temperature distribution which facilitates the formation of a radially symmetrical constriction which in turn has an advantageous effect on the reproducibility of the method of the invention.

Furthermore, it has turned out to be useful when an outwardly tapering outer cone is formed on the softened front end of the hollow cylinder.

The lower end of the hollow cylinder pre-shaped in this way has the shape of a drawing bulb in a first approximation and facilitates the pulling process in that the exit of the end formed in this way out of the annular heating zone, as well as the formation of a pulling piece are simplified.

Particularly for applications where high purity is of decisive importance, a tool is preferably used in the form of a quartz glass tube which is fused with the front end of the hollow cylinder in the form of a joint.

Due to the contact pressure during fusion of hollow cylinder and quartz glass tube, the bead ring is produced that extends around the inner wall of the hollow cylinder.

Furthermore, the above-indicated object, starting from the above-indicated method, is achieved according to the invention in that the inner bore is mechanically machined to a final dimension, and that the constriction of the inner bore is produced in that during mechanical machining in the region of the lower end a collar is produced which extends around the longitudinal axis of the inner bore and projects inwards. In this variant of the method, the inner bore of the hollow cylinder is mechanically machined to a final dimension. Due to the mechanical machining, which particularly includes drilling and grinding, and optionally honing, it is possible by using known grinding methods and commercial apparatus suited therefor to produce a quartz glass blank with an outer diameter of more than 100 mm and a length of more than 2 m completely in a straight hollow cylinder with an accurate circular cross-section and a small dimensional deviation in the range of 1/10 mm.

In this variant of the method, the inner bore of the hollow cylinder is also mechanically machined to a final dimension. As for its definition, its performance and the advantages ensuing from mechanical machining, reference is made to the above explanations which are equally applicable to this variant.

According to the invention, an inwardly projecting collar surrounding the inner bore is produced during mechanical machining in the region of the lower end of the inner bore of the hollow cylinder. This is done in the simplest case in that mechanical machining is stopped in front of the end of the inner bore, so that a region of the original inner bore remains in the form of a step. The collar is normally formed in the shape of a surrounding rectangular step. Thanks to the mechanical machining of the inner wall of the collar it is possible to produce a collar of a predetermined height and shape.

This variant is distinguished on the one hand in that the constriction is produced in one operation with the mechanical machining of the hollow cylinder, and a hot deformation step consuming a lot of time and money is not required therefor. Despite the small efforts, the mechanical machining permits a high dimensional stability of the collar and thus a defined support of the core rod on the collar, as is required for producing high-quality optical components of quartz glass.

It has turned out to be advantageous when the surrounding collar is produced with a maximum height between 0.05 times to 0.3 times the inner diameter of the inner bore, preferably between 0.1 times and 0.2 times the inner diameter of the inner bore.

A collar with a maximum height above the said lower limit prevents the core rod from slipping off or getting jammed, and a core rod is here started from having an outer diameter not less than 0.9 times the inner diameter of the hollow cylinder. On the other hand, for achieving high purity it should be possible to flush the annular gap between core rod and hollow cylinder with a gas up to and directly before the collapsing process. Such a gas flushing is facilitated by a free flow cross-section that is as large as possible. The maximum height of the collar corresponds to the difference between the radius of the inner bore outside the collar and the minimum inner radius of the inner bore. In a collar having a stepped shape, the maximum height corresponds to the step height.

It has turned out to be advantageous when the surrounding collar is produced with an extension, viewed in the direction of the longitudinal axis, which is in the range between 15 mm and 40 mm, preferably below 30 mm.

The end of the hollow cylinder which is provided with the collar is discarded after production of the quartz glass component. The range indicated for the extension of the collar in the direction of the longitudinal axis of the hollow cylinder is a suitable compromise between an adequate load bearing capacity of the collar with respect to the weight of the core rod resting thereon on the one hand and a loss of material which is as small as possible on the other hand.

Advantageously, a collar is produced with an inner cone tapering towards the lower end.

The inner cone helps to center the core rod in the inner bore, thereby stabilizing the drawing process.

Particularly preferred is a variant of the method according to the invention wherein a hollow cylinder is employed having an inner bore which includes a stepped constriction in the region of its lower end prior to mechanical machining to the final dimension.

The stepped constriction is here formed completely or in part in that the hollow cylinder is produced by depositing $SiO_2$ particles onto an elongate carrier rotating about its longitudinal axis with formation of a porous hollow cylindrical blank, and subsequent vitrification of the blank, the stepped constriction being produced by shaping the inner bore during deposition of the SiO$_2$ particles. There are two possibilities for this purpose. With the one possibility, the carrier has a corresponding stepped taper in the region of the blank end. With the other possibility, a cuff of quartz glass is slid onto the carrier, the cuff being embedded into the end region of the developing blank during deposition and forming an integral part of the hollow cylinder after vitrification, thereby effecting the stepped constriction of the hollow cylinder.

The stepped constriction forms the inwardly projecting collar or part thereof. The preliminary formation of the stepped constriction of the hollow cylinder during its manufacturing process through a so-called "soot method" has the advantage that less "good-quality material" must be removed over the length of the inner bore for the formation of a minimum height of the collar.

Another advantage is that the stepped constriction is already present at least in part in the porous blank (soot body), so that said blank can be kept at said step for its further treatment for cleaning, doping or vitrification.

The above-indicated object, starting from the above-indicated method, is also achieved according to the invention in that a raw cylinder is provided having a length several times the length of the hollow cylinder, and a bore which is mechanically machined to a final dimension, and that the raw cylinder bore is heated and partly collapsed in a collapsing zone which is spaced from the front end of the raw cylinder at a distance corresponding at least to the length of the hollow cylinder, and that the raw cylinder is subsequently separated in the region of the collapsing zone.

In this variant of the method, the inner bore of the raw cylinder is mechanically machined to a final dimension. As for its definition, its performance and the advantages ensuing from mechanical machining, reference is made to the above explanations regarding the mechanical machining of the hollow cylinder. These explanations are equally applicable to this variant of the method.

According to the invention the constriction of the inner bore of the hollow cylinder is produced in that in a raw cylinder having several times the length of the hollow cylinder, a zone of plastic deformation is produced by partly collapsing the inner bore. This zone of plastic deformation is provided at a place spaced from the front end of the raw cylinder at a distance at least as great as the predetermined length of the hollow cylinder. In the simplest case the collapsing zone is provided in the center of a raw cylinder with twice the length of the hollow cylinder. In a raw cylinder having four times the length of a hollow cylinder, constrictions must be provided in the lower third and in the upper third, so that four hollow cylinders can be obtained therefrom. After the constriction has been produced by collapsing, the raw cylinder is separated in the region of its collapsing zone or its collapsing zones, so that the resulting cylinder pieces have a constriction at both sides of the separation point and can be used as hollow cylinders within the meaning of the present invention.

This variant of the method offers several advantages. On the one hand, two hollow cylinders are obtained in one operation (collapsing and separating) with a suitable constriction of the inner bore. On the other hand, the constricted lower end of the hollow cylinder produced in this way is formed in the shape of a bulb due to the collapsing step, which facilitates the pulling operation in the intended use of the hollow cylinder. Furthermore, the constriction is produced by collapsing, so that contamination by a tool is avoided.

In a preferred procedure, the raw cylinder consists of at least two start cylinders that are interconnected at the front side and joined in the area of an attachment zone in the form of a joint, heating and partial collapsing of the raw cylinder being carried out in the region of the attachment zone.

Heating and partial collapsing of the raw cylinder in the region of the attachment zone produce a constriction of the inner bore which after the separation process comes to rest on a respective front-side end of a hollow cylinder.

Preferably, at least one of the start cylinders has a reduced wall thickness in the region of the attachment zone.

Due to the reduced wall thickness in at least one of the start cylinders, the position of the collapsing zone is predetermined in an exact manner on the one hand and the formation of the lower end with bulb shape is promoted on the other hand.

Particularly with respect to this, the method of the invention is improved further if the region of reduced wall thickness is configured as a conical taper.

The constriction of the inner bore of the raw cylinder is preferably produced in that the raw cylinder is softened in vertical orientation, suspended in an annular heating element, in the area of its collapsing zone, and is elongated under the influence of its own weight.

This variant of the method permits a continuous generation of constrictions in a correspondingly long raw cylinder.

Alternatively, or as a supplement, a raw cylinder is used which has a cylindrical outer jacket which prior to heating and collapsing is provided with a radially surrounding notch in the area of the collapsing zone.

The setting by the radially surrounding notch produces an exact localization of the constriction, thereby contributing to an improved reproducibility.

It has turned out to be advantageous when a negative pressure is produced in comparison with the pressure externally applied to the cylindrical outer surface during collapsing in the bore.

The negative pressure in the bore of the raw cylinder accelerates the collapsing process and produces additional, inwardly acting forces during collapsing so that accidental variations of other process parameters which might yield an undefined shape and position of the constriction are compensated. In this respect the negative pressure in the bore of the raw cylinder also contributes to an improved reproducibility of the method of the invention.

In all of the above-explained variants of the method of the invention, the quartz glass component is produced in that a core rod is introduced into the inner bore of the hollow cylinder and rests in vertical orientation on the constriction produced in the inner bore. The coaxial arrangement of core rod and hollow cylinder is softened zonewise and elongated into a solid rod, preform or a fiber in this process.

The core rod is a quartz glass rod with a radially homogeneous or radially inhomogeneous refractive index distribution. As a rule, the core rod consists of a core glass having an increased refractive index which is surrounded by a cladding glass having a lower refractive index. The core rod is made in one piece, or it is composed of several short core rod pieces that are superposed in the inner bore of the hollow cylinder. The cladding glass is an integral component of the core rod, or it is provided fully or in part in the form of one or several cladding glass tubes surrounding a quartz glass rod. In the last-mentioned case, the core rod consists of a coaxial arrangement of a quartz glass rod or of one or several cladding glass tubes. In this case the outer diameter of the outer cladding glass tube shall here be understood as the outer diameter of the core rod.

The core rod is guided inside the inner bore of the hollow cylinder and is axially fixed by means of the constriction formed therein. Inside the inner bore, there is either the core rod alone or there is a core rod surrounded by one or several cladding glass tubes which can optionally also be fixed axially by means of the constriction of the inner bore.

The optical component is a solid rod, a preform for optical fibers, or an optical fiber.

The inner bore is normally machined mechanically prior to the method step in which the constriction of the inner bore is produced.

As for the hollow cylinder of quartz glass for carrying out the method of the invention, the above-indicated object, starting from the above-indicated hollow cylinder, is achieved according to the invention in that the inner bore has a surface which is mechanically machined to a final dimension, and that the constriction is formed as a collar which is produced during mechanical machining and projects into the inner bore.

The hollow cylinder of the invention is characterized on the one hand in that it is mechanically machined to a final dimension. The mechanical machining, which particularly includes drilling and grinding, and optionally honing, allows for a high dimensional stability of the hollow cylinder over the whole length thereof. With the help of commercial apparatus it is possible to produce a hollow cylinder of quartz glass having an outer diameter of more than 100 mm and a length of more than 2 m with an exact circular cross-section, a dimensional deviation in the range of less than 1/10 mm being possible.

A hollow cylinder which is mechanically machined to a final dimension within the meaning of the present invention is also a cylinder having an inner surface which has been mechanically machined to a final dimension and has subsequently been cleaned by etching. Uniform etching processes do not impair the geometrical final shape of the hollow cylinder. To be more specific, they do not produce a bend or ovality in the cross section. The hollow cylinder which is mechanically machined to a final dimension is distinguished according to the invention by an inwardly projecting surrounding collar. The collar is formed at one end of the hollow cylinder and it is created in that the mechanical treatment stops in front of this end of the hollow cylinder. In the simplest case the inner diameter of the collar corresponds to the original inner diameter of the quartz glass blank before the mechanical treatment of the inner bore, and the inwardly oriented boundary surface of the collar follows from the contour of the machining tool. However, it is also possible to machine the collar additionally in a mechanical manner, for instance, for expanding the inner diameter, for rounding off, for deburring edges, etc. so that a collar is obtained with a predetermined height and shape.

The collar serves as a constriction of the inner bore of the hollow cylinder during use of the hollow cylinder for producing an optical component, a core rod being used in the inner bore of the hollow cylinder that rests with its lower end on the collar.

The hollow cylinder of the invention is distinguished in that the constriction is produced in one operation with a mechanical treatment, so that a hot deformation step consuming a lot of time and money is not needed, and a high dimensional stability of the collar and thus a defined support of the core rod are achieved in addition.

It has turned out to be advantageous when the surrounding collar has a maximum height which is 0.05 to 0.3 times the inner diameter of the inner bore, preferably between 0.1 to 0.2 times the inner diameter of the inner bore.

A collar having a height above the said lower limit prevents the core rod from slipping off or getting jammed, a core rod being started from having an outer diameter which is not less than 0.9 times the inner diameter of the hollow cylinder. On the other hand, for the achievement of a high purity it should be possible to flush the annular gap between core rod and hollow cylinder with a gas up to and directly before the collapsing process. Such a gas flushing is facilitated by a free flow cross-section that is as large as possible. The maximum height of the collar corresponds to the difference between the radius of the inner bore outside the collar and the minimum inner radius of the inner bore. In a collar having a stepped form, the maximum height corresponds to the step height.

Moreover, it has turned out to be advantageous when the surrounding collar has an extension, viewed in the direction of the longitudinal axis, which is in the range between 15 mm and 40 mm, preferably below 30 mm.

The end of the hollow cylinder which is provided with the collar is discarded after production of the quartz glass component. The range indicated for the extension of the collar in the direction of the longitudinal axis of the hollow cylinder is an appropriate compromise between an adequate load bearing capacity of the collar with respect to the weight of the core rod resting thereon on the one hand and a loss of material that is as small as possible on the other hand.

In a particularly preferred embodiment of the hollow cylinder of the invention, the end of the hollow cylinder which is provided with the constriction is formed as an outer cone.

The lower end of the hollow cylinder pre-shaped in this manner has the shape of a drawing bulb in a first approximation, and facilitates the pulling process in that the exit of the end shaped in this manner out of the annular heating zone, as well as the configuration of a pulling piece are simplified.

Advantageously, the collar has an inner cone tapering towards the end of the inner bore.

The inner cone which can be produced in a simple manner by means of a conical machining tool helps to center the core rod in the inner bore, thereby stabilizing the drawing process.

Figure 2:
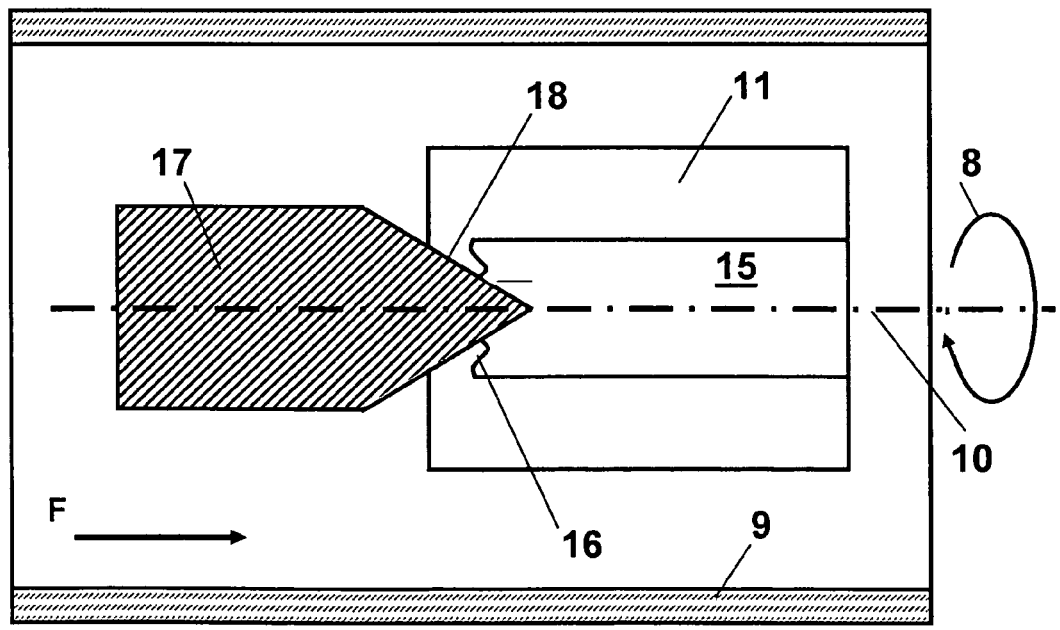
Figure 3:
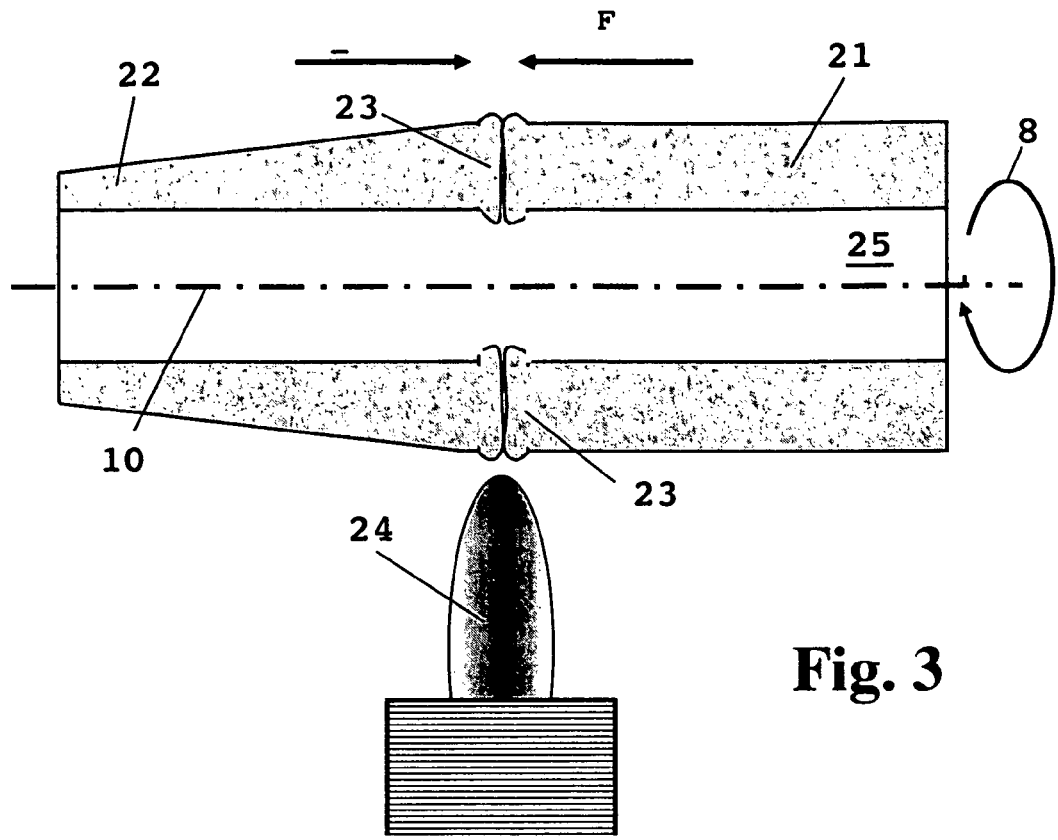
Figure 4:
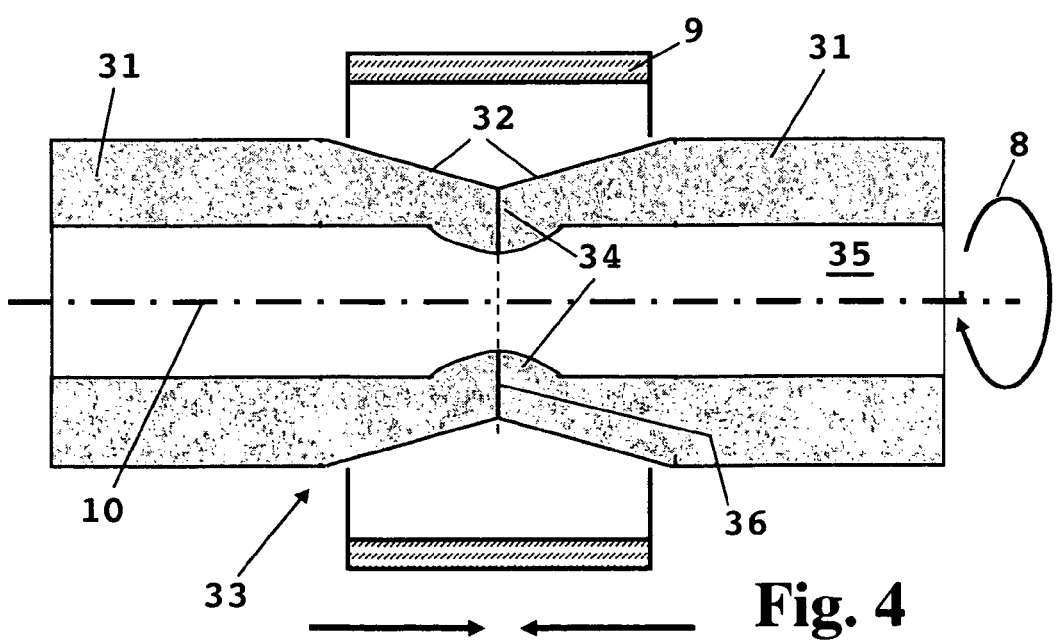
Figure 5:
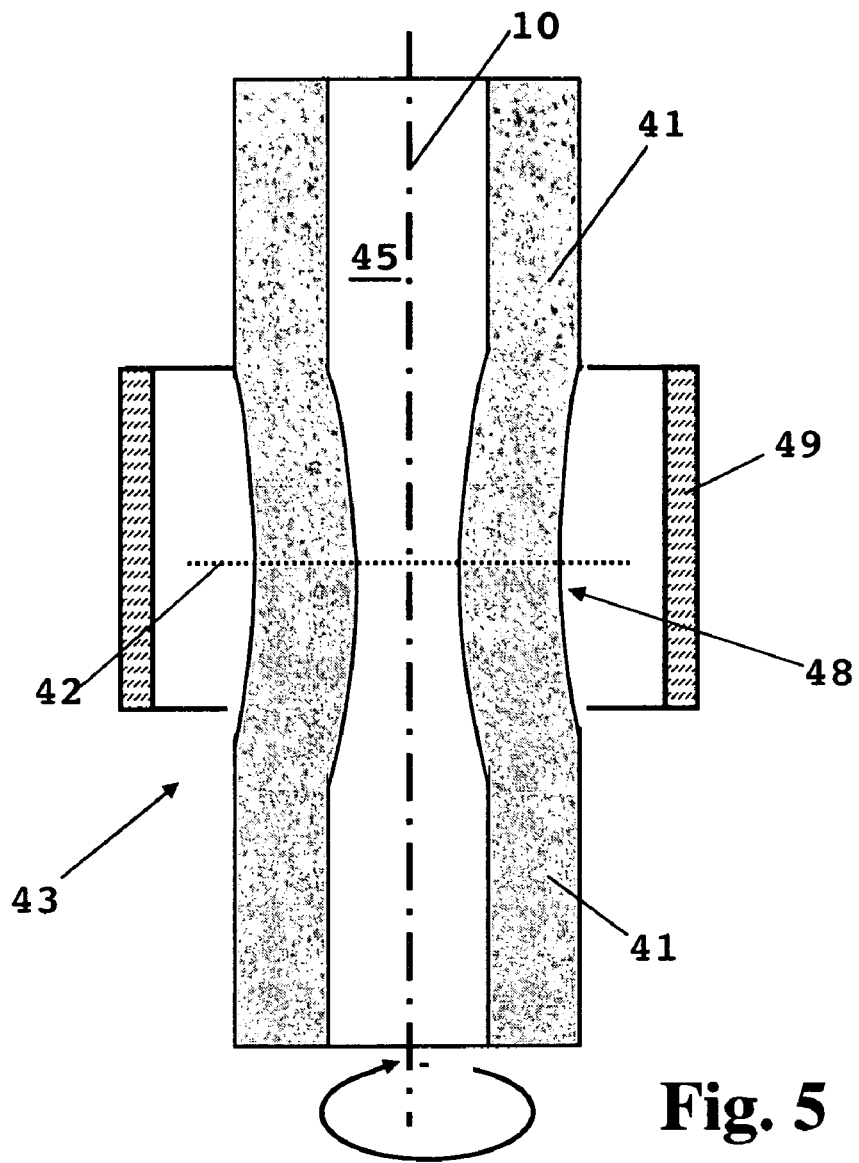
Figure 6:
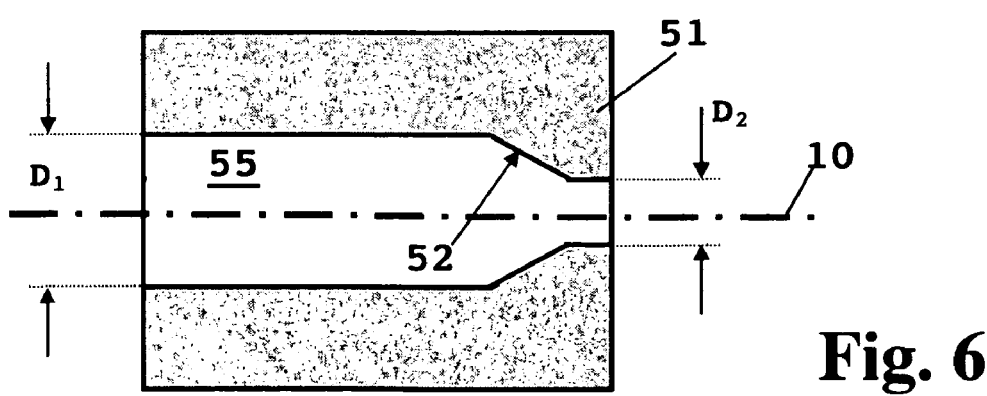

The method according to the invention shall now be explained in more detail with reference to embodiments and a drawing, which is a schematic illustration showing in detail in FIG. 1: a method step for producing a constriction at the end of a hollow cylinder of quartz glass by plastic deformation with use of a graphite tube in a first method variant;

FIG. 2: a method step for producing a constriction at the end of a hollow cylinder of quartz glass by plastic deformation with use of a graphite tool in a second method variant;

FIG. 3: a method step, for producing a constriction at the end of a hollow cylinder of quartz glass by plastic deformation with use of a quartz glass tool;

FIG. 4: a method step for producing a constriction by joining the front sides of two hollow cylinders with deformation;

FIG. 5: a method step for producing a constriction in the center of a raw cylinder of quartz glass by collapsing the inner bore under the action of its own weight; and FIG. 6: a section of a hollow cylinder according to the invention with a mechanically machined inner bore, in a longitudinal section.

The hollow cylinders, which will be described in more detail hereinafter, are used for producing optical fibers, each having a core region which is surrounded by an inner cladding glass layer and an outer cladding glass layer.

The core region consists of quartz glass which is homogeneously doped with 5% by wt. of germanium oxide. The two cladding glass layers consist of undoped quartz glass, the quartz glass for the outer one of the cladding glass layers being provided by the respective hollow cylinder.

First of all, a so-called core rod is produced according to the OVD method. To this end soot particles are deposited layerwise on a carrier rotating about its longitudinal axis by reciprocating a deposition burner, the deposition burner being supplied with $SiCl_4$ and $GeCl_4$ which are hydrolyzed in a burner flame in the presence of oxygen to obtain $SiO_2$ and $GeO_2$. The ratio of $SiCl_4$ and $GeCl_4$ is adjusted during deposition of the inner layers such that a predetermined homogeneous $GeO_2$ concentration of 5 mol % is obtained over this part of the wall thickness of the soot tube. As soon as the soot layers forming the core region of the core rod have been deposited, the supply of $GeCl_4$ to the deposition burner is stopped and an inner cladding glass layer of undoped $SiO_2$ is deposited.

After completion of the deposition method and removal of the carrier a soot tube is obtained which is subjected to a dehydration treatment for removing the hydroxyl groups introduced due to the manufacturing process. To this end the soot tube is introduced in vertical orientation into a dehydration furnace and is first treated at a temperature ranging from 800° C. to 1000° C. in a chlorine-containing atmosphere. The treatment lasts for about eight hours. This yields a hydroxyl group concentration of less than 100 wt ppb. The soot tube treated in this way is vitrified in a vitrification furnace at a temperature in the range of about 1350° C. and the inner bore is collapsed in this process, resulting in a core rod having an outer diameter of 30 mm and the desired refractive index profile. Depending on the length, the weight of the core rod is up to 10 kg. In the optical fiber to be produced with an outer diameter of 125 μm, the core rod forms a core region having a diameter of about 8.5 μm.

As an alternative to the above-described manufacturing method of the core rods according to the OVD method, said rods are produced according to the known MCVD, VAD or PCVD method.

At any rate further cladding material is provided for forming the outer cladding glass layer in the form of the one hollow cylinder, said material being collapsed onto the core rod during fiber drawing in an ODD method. The hollow cylinder is produced by analogy with the above-described production of the core rod with the help of a standard OVD method, but without addition of a dopant. After removal of the carrier a soot tube is obtained which is subjected to the above-described dehydration method and is subsequently vitrified.

The outer wall of the resulting quartz glass tube is ground by way of peripheral infeed grinding or longitudinal grinding in several operations with use of successively finer grain sizes to the desired outer dimension. Likewise, the inner bore is drilled by a drill and reworked by honing for the purpose of a high-precision finishing treatment with respect to shape and surface quality. This yields a straight bore extending in the direction of the longitudinal axis and having an exactly circular cross-section. To reduce surface tensions and to remove damage caused by surface treatment, the quartz glass tube is etched in a hydrofluoric acid bath for a short period of time, the HF concentration of said bath ranging from 5% to 30%.

The resulting quartz glass tube has an outer diameter of 120 mm, an inner diameter of 32.4 mm, and a length of 2500 mm. The dimensional deviation ($t_{max}-t_{min}$) in the wall thickness is 0.5 mm.

The quartz glass tube is cut to suitable partial lengths which are used as hollow cylinders within the meaning of the present invention for producing optical fibers with the help of an ODD method. To this end a coaxial arrangement of core rod and hollow cylinder is supplied in vertical orientation to a heating zone and is softened therein zonewise, starting with the lower end, in an annular furnace to a temperature around 2050° C. and an optical fiber is drawn from the softened region in this process. At the beginning of the drawing method the core rod is supported on a constriction of the hollow cylinder. The generation of a suitable constriction will now be explained in more detail with reference to FIGS. 1 to 5.

FIG. 1 shows the lower end of a hollow cylinder 1 which after having been softened is plastically deformed by means of a graphite frame, which has assigned thereto reference numeral 2 on the whole. To this end the hollow cylinder 1 and the graphite frame 2 are heated in a furnace 9 to a temperature around 1700° C. Subsequently, the graphite frame 2 is pressed against the lower end of the hollow cylinder 1. The graphite frame 2 is provided with a surrounding V-groove 3 whose maximum outer diameter is only a few millimeters larger than the outer diameter of the hollow cylinder 1, and whose inner diameter is formed by a peg 4 which projects into the inner bore 5 of the hollow cylinder 1. The graphite frame 2 is pressed against the lower end of the hollow cylinder 1 rotating about its longitudinal axis 10, as outlined by rotational arrow 8 and directional arrow "F" (direction of force). In the upsetting operation, the softened quartz glass is folded inwards and comes to rest on the cylindrical outer surface of the peg 4. This leads to the formation of an inwardly oriented collar 6 which serves as a constriction of the inner bore 5 in the sense of this invention. As a consequence of the oblique outer surface of the V-groove 3, the lower end of the hollow cylinder 1 is formed as an outer cone 7.

FIG. 2 shows an alternative variant for producing a constriction of the inner bore 15 at the end of a hollow cylinder 11. To this end a graphite linkage 17, which includes a tip 18 projecting into the inner bore 15, and the hollow cylinder 11 are introduced into a furnace 9 and softened therein to a softening temperature around 1700° C. Since the tip 18 of the graphite linkage 17 is pressed against the lower front side of the hollow cylinder 11, which is rotating about the longitudinal axis 10 of the hollow cylinder, quartz glass material is folded inwards and is built up in the form of an inwardly projecting bead 16 around the conical surface of the tip 18 of the graphite linkage 17.

A further variant for producing a suitable constriction of the inner bore 25 of a hollow cylinder 1 of quartz glass is shown in FIG. 3. The lower front end of the hollow cylinder 21 has attached thereto a conical quartz glass tube 22 which at the contact point with the hollow cylinder 21 has approximately the same outer and inner diameters as the hollow cylinder 21. The contact point is softened by means of a burner 24 and the pressure of the front faces acting on each other, as outlined by directional arrows "F", upsets quartz glass which forms a bead 23 extending on the inner wall and on the outer wall. The conical quartz glass tube 22 is here fused with the lower end of the hollow cylinder 21 and forms a suitable pulling aid due to its outer shape in the drawing method proper.

In the variant of the method shown in FIG. 4, which is used for producing a constriction of an inner bore 35, the respective ends 32 of two hollow cylinders 31 are first conically tapered, and the conically tapered ends 32 are subsequently joined as a joint with formation of a raw cylinder 33 having twice the length. In the joining process of the two hollow cylinders, a negative pressure of 100 mbar as compared with the external pressure is set in the inner bore 35 of the raw cylinder 33, so that in the region of the two conically tapered ends 32 a surrounding inner bead 34 is formed due to the reduced wall thickness at said place. Subsequently, the two hollow cylinders 31 are separated in the region of the inner bead 34, as outlined by line 36, so that each of the hollow cylinders 31 obtained in this way keeps part of the inner bead 34, the bead forming a constriction of the inner bore 35 in the sense of the present invention.

FIG. 5 shows a further variant of the method for producing a constriction of the inner bore 45 of a hollow cylinder 41, a tubular strand 43 being supplied in vertical orientation to an annular furnace 49, and a partial length of the tubular strand 43 having a length of about 30 cm being heated inside the annular furnace 49 to a temperature above the softening temperature of quartz glass. The tubular strand's 43 own weight creates a restriction 48 and thus a constriction of the inner bore 45. The region of the restriction 48 has here been chosen such that the length of the tubular strand 43 below the restriction 48 corresponds at least to the length as is required for producing a hollow cylinder 41. In the region of the restriction 48, the tubular strand 43 is subsequently separated, as outlined by the broken line 42, so that a hollow cylinder 41 is obtained which due to the restriction 48 has a constriction of the inner bore 45 in the sense of the present invention.

The partial length of the tubular strand 43 above the restriction 48 produced in this way is also suited as a hollow cylinder 41 in the sense of the present invention on condition that it has an adequate length. Hence, it is thereby possible to produce two hollow cylinders in a deformation process with a constriction of the inner bore.

FIG. 6 is a schematic illustration showing an embodiment of the hollow cylinder 51 of the invention, the hollow cylinder comprising an inner bore 55 which is provided at the lower end with a constriction which is formed by a stepped, inwardly projecting conical collar 52. The collar 52 has a length of 20 mm, viewed in the direction of the longitudinal axis 10 of the hollow cylinder, and the maximum height of the collar 52 ($=\frac{1}{2}\times(D1-D2)$) is about 4 mm, which is slightly larger than 0.1 times the diameter D1 of the inner bore 55, and a core rod is here used having an outer diameter 0.9 times that of the inner bore. The surrounding conical collar 52 is obtained during mechanical machining of the hollow cylinder 51 by using a conical machining tool and by stopping the mechanical machining operation before penetration at the lower end of the hollow cylinder 51, so that that region of quartz glass is allowed to remain that forms the collar 52.

The invention claimed is:

1. A method for producing an optical component of quartz glass, said method comprising:
    elongating a coaxial arrangement of a core rod and a hollow cylinder of a predetermined length,
    wherein the arrangement is supplied in vertical orientation to a heating zone and is softened therein zonewise, starting with a lower end thereof, and the component is drawn off downwards from a softened region of the arrangement,
    the hollow cylinder having an inner bore that is provided with a constriction in the region of its lower end on which the core rod is supported, and
    wherein a raw cylinder is provided which is longer than the hollow cylinder to be elongated,
    the method further comprising mechanically machining the raw cylinder so that the raw cylinder has a bore that is mechanically machined to a final dimension, and
    wherein the raw cylinder bore is heated in a collapsing zone spaced apart from a front end of the raw cylinder at a distance corresponding at least to the length of the hollow cylinder so that the raw cylinder is collapsed in part, and
    wherein the hollow cylinder is subsequently separated in the region of the collapsing zone.

2. The method according to claim 1, wherein the raw cylinder comprises at least two start cylinders connected to each other at ends thereof and joined in the region of an attachment zone in the form of a joint, and wherein the step of heating and partial collapsing of the raw cylinder is carried out in the area of the attachment zone.

3. The method according to claim 2, wherein at least one of the start cylinders has a reduced wall thickness in the region of the attachment zone.

4. The method according to claim 3, wherein the region of reduced wall thickness is configured as a conical taper.

5. The method according to claim 1, wherein the raw cylinder is softened in vertical orientation, is suspended in an annular heating element in the region of the collapsing zone and is elongated under weight of said raw cylinder.

6. The method according to claim 1, wherein the raw cylinder has a cylindrical outer jacket which prior to heating and collapsing in the region of the collapsing zone is provided with a radially surrounding notch.

7. The method according to claim 1 wherein a negative pressure relative to a pressure externally applied to a cylindrical outer surface of the raw cylinder is produced in a bore therein during the collapsing.

8. A method for producing an optical component of quartz glass, said method comprising:
    producing a hollow cylinder having a length from a raw cylinder of quartz glass as starting material, said raw cylinder having a length greater than the length of the hollow cylinder, said producing including the steps of
    a. mechanically machining the raw cylinder so that the raw cylinder has an inner bore therein that has been machined to a final dimension;
    b. heating the raw cylinder bore in a collapsing zone so as to partially collapse a portion of the raw cylinder and inner bore thereof in said collapsing zone, said collapsing zone being spaced at a distance from an end of the raw cylinder, said distance being at least the length of the hollow cylinder; and
    c. separating the hollow cylinder in the region of the collapsing zone from a remaining portion of the raw cylinder so that the hollow cylinder has a first end with a constriction therein comprising at least part of the collapsed portion of the raw cylinder;
    forming a coaxial arrangement with said hollow cylinder wherein a core rod of quartz glass is supported coaxially in the hollow cylinder, with the core rod having an end supported in the constriction in the first end of the hollow cylinder; and
    elongating the coaxial arrangement, including
    supplying the coaxial arrangement in vertical orientation to a heating zone and
    softening the coaxial arrangement therein zonewise, starting with a lower end thereof, and
    drawing off the optical component downward from a softened region of the coaxial arrangement.

9. The method according to claim 8, wherein the raw cylinder comprises at least two start cylinders connected to each other in an attachment zone, and wherein said heating and partial collapsing of the raw cylinder takes place in the attachment zone, and the separating makes one of said start cylinders become the hollow cylinder, and another of the start cylinders becomes or is used to form a second hollow cylinder.

10. The method according to claim 9, wherein the second hollow cylinder has a constriction therein in the attachment zone.

11. The method according to claim 10, wherein the reducing of the wall thickness includes configuring a conical taper in a region of the reduced wall thickness.

12. The method according to claim 9, and further comprising reducing a wall thickness of at least one of the start cylinders in the attachment zone.

13. The method according to claim 8, and further comprising softening the raw cylinder in a vertical orientation by suspending an annular heating element in a region of the collapsing zone, and said raw cylinder is elongated by a force from weight of at least part of the raw cylinder in said vertical orientation.

14. The method according to claim 8, and further comprising providing a cylindrical outer jacket with a radially surrounding notch to the raw cylinder just prior to heating and collapsing thereof in the collapsing zone.

15. The method according to claim 8, and further comprising producing in the inner bore of the raw cylinder a negative pressure relative to a pressure externally applied to a cylindrical outer surface of the raw cylinder during the collapsing.

* * * * *